US009264923B1

(12) United States Patent
Sevindik et al.

(10) Patent No.: US 9,264,923 B1
(45) Date of Patent: Feb. 16, 2016

(54) SIGNAL SEGMENTATION, EVENT RECOGNITION, EXTRACTION AND CLASSIFICATION FOR EMULATING WIRELESS NETWORK

(71) Applicants: Volkan Sevindik, Wellesley Hills, MA (US); Deepak Das, Arlington, MA (US); Steve Walsh, Brighton, MA (US)

(72) Inventors: Volkan Sevindik, Wellesley Hills, MA (US); Deepak Das, Arlington, MA (US); Steve Walsh, Brighton, MA (US)

(73) Assignee: AZIMUTH SYSTEMS, INC., Acton, MA (US)

( * ) Notice: Subject to any disclaimer, the term of this patent is extended or adjusted under 35 U.S.C. 154(b) by 666 days.

(21) Appl. No.: 13/655,646

(22) Filed: Oct. 19, 2012

Related U.S. Application Data

(60) Provisional application No. 61/549,399, filed on Oct. 20, 2011, provisional application No. 61/703,887, filed on Sep. 21, 2012.

(51) Int. Cl.
H04W 24/00 (2009.01)
H04W 24/06 (2009.01)

(52) U.S. Cl.
CPC .................................. H04W 24/06 (2013.01)

(58) Field of Classification Search
USPC .................. 455/423–425, 67.11–67.16, 67.7; 714/25, 27, 28, 32, 33
See application file for complete search history.

(56) References Cited

U.S. PATENT DOCUMENTS

| | | | | |
|---|---|---|---|---|
| 6,493,755 B1* | 12/2002 | Hansen et al. | | 709/224 |
| 6,898,746 B2* | 5/2005 | Jain et al. | | 714/724 |
| 7,324,588 B2* | 1/2008 | Green et al. | | 375/224 |
| 7,349,670 B2* | 3/2008 | Mlinarsky et al. | | 455/67.11 |
| 7,395,060 B2* | 7/2008 | Liu | | 455/423 |
| 7,447,622 B2* | 11/2008 | Arama et al. | | 703/23 |
| 7,508,868 B2* | 3/2009 | Chang | | 375/224 |
| 7,555,421 B1* | 6/2009 | Beckett et al. | | 703/23 |
| 7,783,261 B2* | 8/2010 | Peng et al. | | 455/67.11 |
| 8,412,112 B2* | 4/2013 | Foegelle | | 455/67.12 |
| 8,521,092 B2* | 8/2013 | Kennedy et al. | | 455/67.11 |
| 8,718,122 B2* | 5/2014 | Griesing et al. | | 375/224 |
| 8,761,684 B2* | 6/2014 | Reed | | 455/67.11 |
| 8,793,093 B2* | 7/2014 | Mow et al. | | 702/108 |
| 8,995,511 B2* | 3/2015 | Reed | | 375/224 |
| 2006/0229018 A1* | 10/2006 | Mlinarsky et al. | | 455/67.11 |
| 2007/0099606 A1* | 5/2007 | Strohlein et al. | | 455/423 |

* cited by examiner

Primary Examiner — Tuan A Tran
(74) Attorney, Agent, or Firm — Anderson Gorecki & Rouille LLP

(57) ABSTRACT

One or more events recorded in one or more log files are recognized and processed by performing one or more operations including segmentation, modification, extraction, addition, and subtraction. The processed events are used to generate a playback file which is used by a channel emulator to perform testing.

69 Claims, 5 Drawing Sheets

SIGNAL SEGMENTATION, EVENT RECOGNITION, EXTRACTION AND CLASSIFICATION FOR EMULATING WIRELESS NETWORK

CROSS-REFERENCE TO RELATED APPLICATIONS

Priority is claimed to U.S. Provisional Patent Application 61/549,399, entitled RISING PILOT, filed Oct. 20, 2011, and also to U.S. Provisional Patent Application 61/703,887, entitled SIGNAL SEGMENTATION, EVENT RECOGNITION, EXTRACTION AND CLASSIFICATION FOR EMULATING WIRELESS NETWORK, filed Sep. 21, 2012, both of which are incorporated by reference.

FIELD OF THE INVENTION

This invention is generally related to test equipment, and more particularly to test equipment for wireless network emulation.

BACKGROUND OF THE INVENTION

Cellular networks and Wireless Local Area Networks ("WLANs") enable communications between mobile wireless devices such as user terminals (UEs) which can include mobile phones and portable computers and fixed location wireless devices such as access points and base stations. It is common practice to test the performance of such devices under various network conditions. However, testing wireless devices in an open environment is notoriously difficult because wireless communications can be affected by ambient sources of interference. It is now relatively common to use system level network emulators to perform wireless device testing in a controlled environment. One type of emulator includes a separate container for each wireless device to shield against external electromagnetic interference (EMI). Communications are converted from wireless radio frequency (RF) to wired signals, and the containers are placed in communication via wired connections. A channel emulator connected between the containers subjects the communications to simulated physical environmental effects.

Various types of tests can be performed with a channel emulator. For example, the tests can be designed to create either hypothetical conditions or recreate realistic conditions. One type of realistic test is system level network emulation. In a system level emulation the system level network conditions experienced by a wireless network are recorded and subsequently recreated in the lab using channel emulator. The recreated conditions will emulate the telecommunication network by replaying the number of available sectors and pilot signals, power of pilot signals, received signal power levels, signal-to-noise-plus-interference ratio (SNIR). Such an emulation can be used for evaluation of hand-off situations, average sector throughput, average delay, average network throughput, the performance of different traffic types such as best effort (BE), expedited forwarding (EF), and assured forwarding (AF). Emulation is performed using the logs saved in different components of the telecommunication network. These logs are synchronized, combined and processed in such a way that the real network behavior is recreated.

SUMMARY OF THE INVENTION

Aspects are predicated in part on recognition that a log file may contain relatively few events of interest. Furthermore, the events of interest may be of relatively brief duration relative to the duration of the log file. This is problematic because it is inconvenient and inefficient to perform a test in which a significant portion of the test time produces no results of interest. Moreover, it may be desirable to include different events from different log files in a test, repeat an event during a test, and manipulate characteristics of an event or copies of an event. It is also desirable to modify the signal in the log file through addition, subtraction, extraction processes in order to create a unique version of the signal which will represent a totally new signal or a new unique event.

According to an aspect of the invention, a method comprises: using a computer, recognizing events recorded in one or more log files of conditions in a wireless network; selecting at least first and second recognized events; processing ones of the selected events by performing one or more operations including segmentation, modification, extraction, addition, and subtraction; generating a playback file which represents the processed events; and assigning at least some resources of a channel emulator based on the playback file; and recreating conditions represented in the playback file using a channel emulator.

According to another aspect of the invention, an apparatus comprises: a processor which utilizes a computer program which: recognizes events recorded in one or more log files of conditions in a wireless network; selects at least first and second recognized events; processes ones of the selected events by performing one or more operations including segmentation, modification, extraction, addition, and subtraction; and generates a playback file which represents the processed events; and a channel emulator which assigns at least some resources based on the playback file and recreates conditions represented in the playback file using the resources.

According to another aspect of the invention a computer program stored on non-transitory computer-readable memory for implementing steps comprises: logic which recognizes events recorded in one or more log files of conditions in a wireless network; logic which selects at least first and second recognized events; logic which processes ones of the selected events by performing one or more operations including segmentation, modification, extraction, addition, and subtraction; logic which generates a playback file which represents the processed events; logic which assigns at least some resources of a channel emulator based on the playback file; and logic which recreates conditions represented in the playback file using a channel emulator.

DETAILED DESCRIPTION

Figure 1:
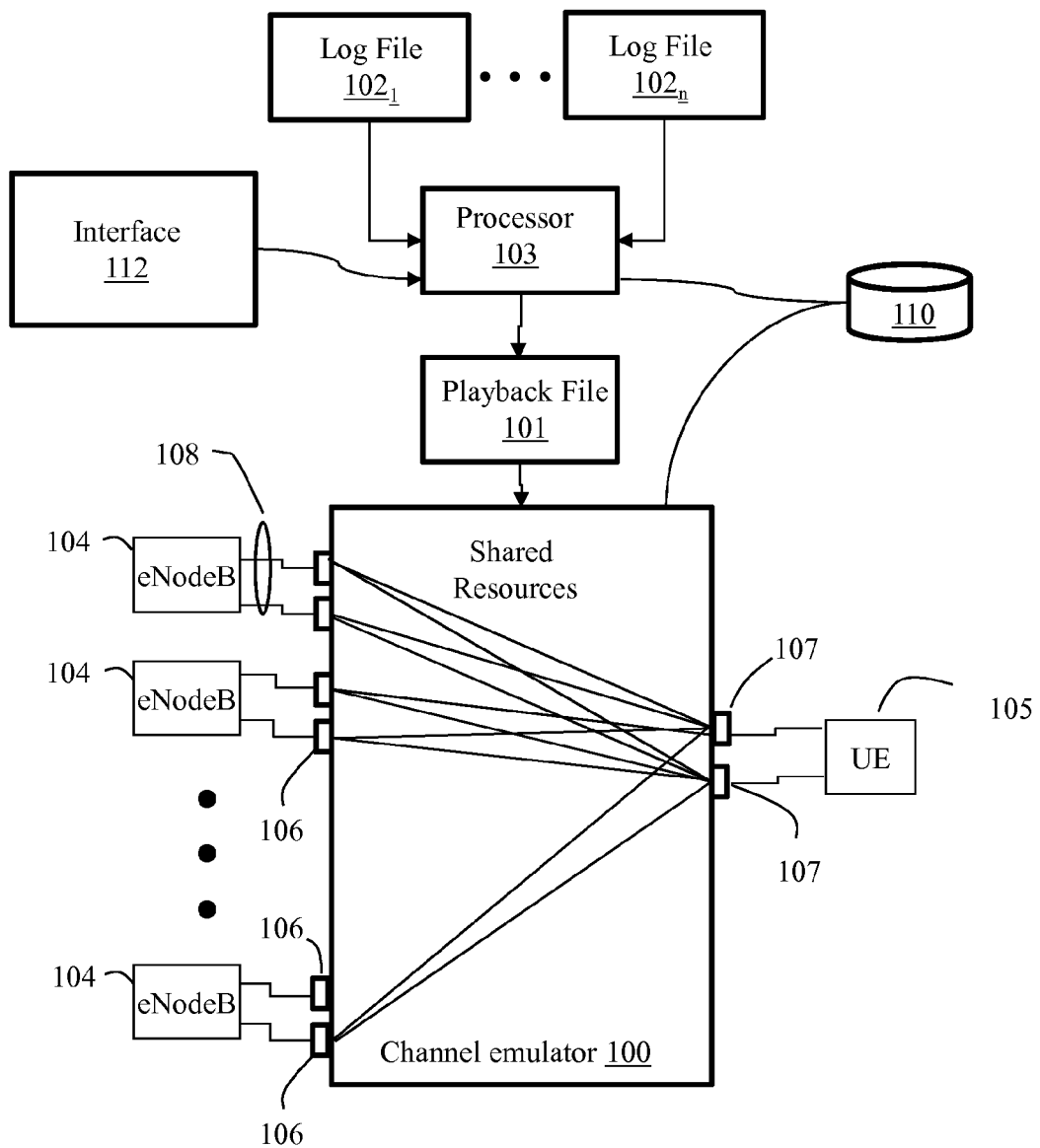
FIG. 1 illustrates a channel emulator for testing wireless devices in a controlled environment.

FIG. 1 illustrates a channel emulator 100 for performing wireless device testing in a controlled environment. Certain functions may be performed with processing hardware using computer program code stored on non-transitory computer readable media 110. The channel emulator is operable to interconnect a set of two or more wireless devices in order to simulate effects on communications between the devices by using various shared resources. More particularly, the channel emulator functions to recreate conditions which are described by a playback file 101. The playback file 101 is created by a processor 103 from hypothetical scenarios or one or more log files 102₁ through 102ₙ created by devices of a real telecommunication network. The log files contain network performance indicators including but not limited to one or more of power measurements, cell information, sector information, location information, data rate, throughput, wireless channel signal quality, and handoff parameters. The wireless devices are shown to include user equipment (UE) 105 and next generation evolved base stations (eNodeB) 104, but a wide variety of specific devices might be used including but not limited to wireless phones, portable computers, base stations, base station controllers, and diagnostic monitors. The wireless devices may be disposed in separate housings which provide shielding from external EMI, thereby enabling testing in a relatively small space. External cabling 108 is employed by the user in place of antennas to connect the wireless devices to ports on the channel emulator 100. In the illustrated example, each port 106 is associated with a particular antenna port of the base station 104 to which it is connected by a cable, and each port 107 is associated with a particular antenna port of the UE 105 to which it is connected by a cable. An interface 112 is provided for presenting the log files and playback file to an operator and external application. For example, data can be presented graphically on a display and also in a data file. The interface also functions to receive an external indication of event recognition, e.g., manual event recognition by an operator or automated event recognition by the external application.

The signals transmitted between devices such as UEs 105 and base stations 104 are selectively modified by the shared resources of the channel emulator 100 in order to simulate effects including but not limited to multipath reflections, delay spread, angle of arrival, power angular spread, angle of departure, antenna spacing, antenna geometry, Doppler from moving vehicle, Doppler from changing environments, path loss, shadow fading effects, reflections in clusters and external interference such as radar signals, phone transmission and other wireless signals or noise. Furthermore, the channel emulator creates conditions that will provide to the device under test a number of available sectors and pilot signals, power of pilot those signals, received power levels, signal-to-noise-plus-interference ratio (SNIR), and hand-off situations. These conditions can be used to evaluate performance such as average sector throughput, average delay, average network throughput, the performance of different traffic types such as best effort (BE), expedited forwarding (EF), and assured forwarding (AF). Conditions are described by the playback file such that the playback file indicates to the channel emulator how to control the shared resources.

Figure 2:
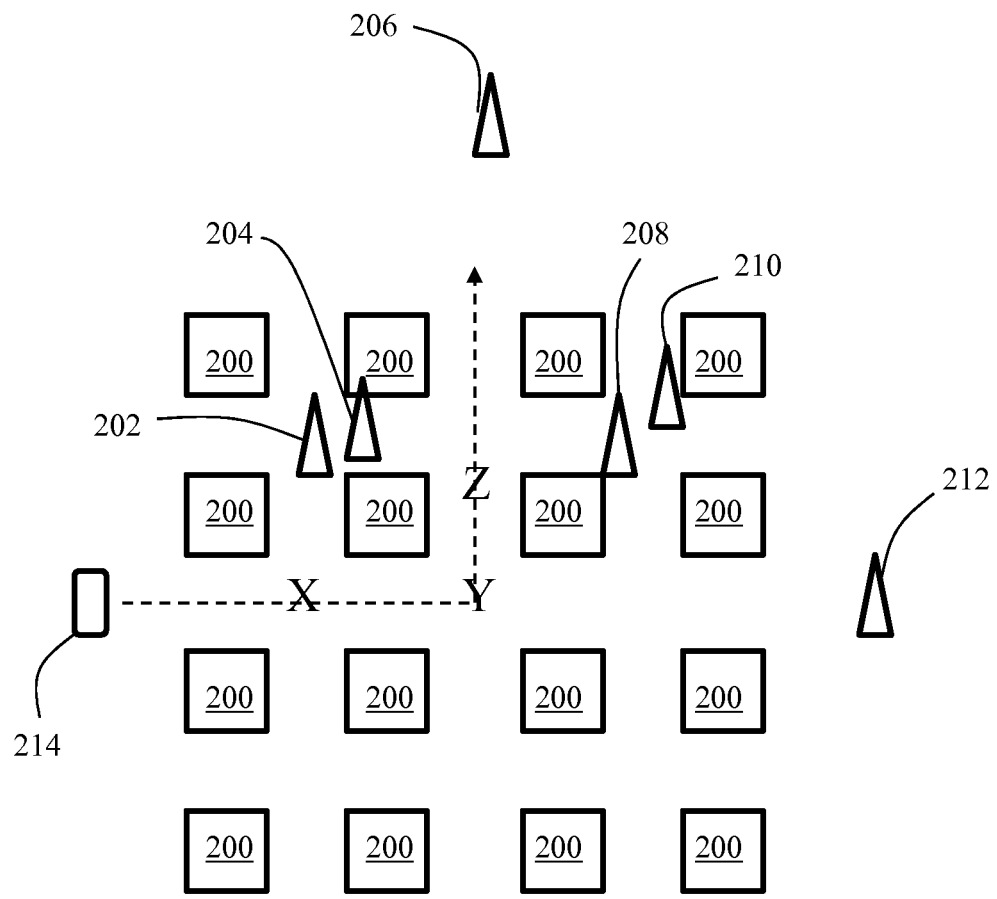
FIG. 2 represents a simplified urban environment from which real experienced system level network conditions are logged.

FIG. 2 represents a real yet simplified urban environment for which system level network conditions are logged, thereby creating log files. Signals tend to reflect from some surfaces and arrive at a destination via multiple paths, but in this simplified environment those effects are not considered in order to provide a more readily understandable description. The illustrated environment includes obstructions such as buildings 200 and base stations 202-212 via which a UE 214 can obtain network connectivity. In the illustrated example the UE may initially detect only base station 212 due to obstructions to the other base stations. However, at point X the UE detects base station 202 as well as 212. Furthermore, the signal from base station 202 may be greater than that of base station 212 as measured by the UE 214. The log files are created as the UE 214 is moved through the environment in order to record actual conditions as experienced by the UE and other devices, e.g., base stations 202-212.

Referring generally to FIGS. 1 through 4, certain improvements in wireless network emulation are associated with event recognition, event classification, signal segmentation, addition, modification, subtraction, and extraction. Log files 102₁ through 102ₙ are provided as input. The log files may be any kind of log file that can be collected by any cellular telecommunication network component such as user terminal (UE), diagnostic monitors (DM), base stations (BSs), next generation evolved base stations (eNodeB), and base station controllers. The log files can be any type of file format, any size, title, name, extension, suffix, and prefix. The log files contain key network related performance indicators such as but not limited to power measurements, cell information, sector information, location information, data rate, throughput, wireless channel signal quality, and handoff parameters. The user will able to select different sections of the log file. These sections contain key telecommunication network events such as call drops, handovers, capacity and coverage issues. Events are the unique real network scenarios that occur during the operation of any cellular wireless telecommunication networks. All unique events present in the UE log file(s) can be presented on the graphical user interface, The user will able to change the sequence of events by dragging and dropping on any graphs presented in graphical user interface. An auto event selection feature may also be provided such that a selection algorithm selects and classifies unique network events automatically. Classification may be based on the types of events and uniqueness of the events in the log file. The event selection algorithm selects and filters to distinguish unique events by identifying different unique event patterns in the UE log file(s). The uniqueness of an event may be decided based on the distribution and statistics of the event throughout the log file. These patterns may be explored by using statistical techniques, and the best statistical technique may be selected based on the nature of the events present in specific log file(s). Statistical techniques may include but are not limited to mean (average), standard deviation, variance, higher order statistical moments of power and duration of sectors, base stations, evolved base stations seen in the log file. Correlation, covariance, and correlation coefficient may be used to find the relationship between the events, and to determine the uniqueness of an event. An algorithm may also be used to automatically find types of events that the user describes. The user will also select types of events from a pre-generated event type list based on the log files imported into the software. The system can also create new log files that include only the events happening in one or more original drive log files. In other words, the new log file contains the real event information from one or more UE log file(s). An advantage of the new log file is that it will shorten the emulation time, and will facilitate creation of stress test scenarios. One or more new log files may be imported into the software just like any other log file collected from network components. System level emulation can then be performed in order to emulate the unique events happening in the telecommunication network.

The interface 112 facilitates monitoring and customization. Once the log file or log files are loaded into the computer software, and computer software will parse and analyze the data in the log file(s). The log files are collected via the User Terminal (UE), and can be generated in any wireless telecommunication network. A typical log file consists of critical power measurements, network related parameters, and UE related parameters. All of the power measurements, sector IDs, critical network events and parameters can be presented on the graphical user interface. Signal power measurements may be shown both in a temporal manner, and a statistical manner. The user can interact with the temporal graph of the signal power measurement. This interaction can be in terms of modifying some parts of the signal, making addition to the signal, removing or subtracting some part(s) of the signal, and extracting some parts of the signal. These processes can be done manually by the user using the graphical user interface of the software, and/or can be automated by predefined rules. The user can create a totally new signal power graph by modification, extraction, addition, or/and subtraction processes that are not recorded by the UE, and do not exist in the network. Therefore, users will advantageously be able to create new unique signals with user-selected power values. Users will also advantageously be able to create new network events by modifying signal powers, and emulate these events in the lab to test the performance of UEs under different network conditions. Important network events may include but are not limited to handoffs, handovers, call drops, low throughput values, low signal power values, sudden decrement of signal power values, sudden increment of signal power values, connection drops, access failures, UE battery failures, eNodeB, NodeB and/or Base station failures.

Figure 3:
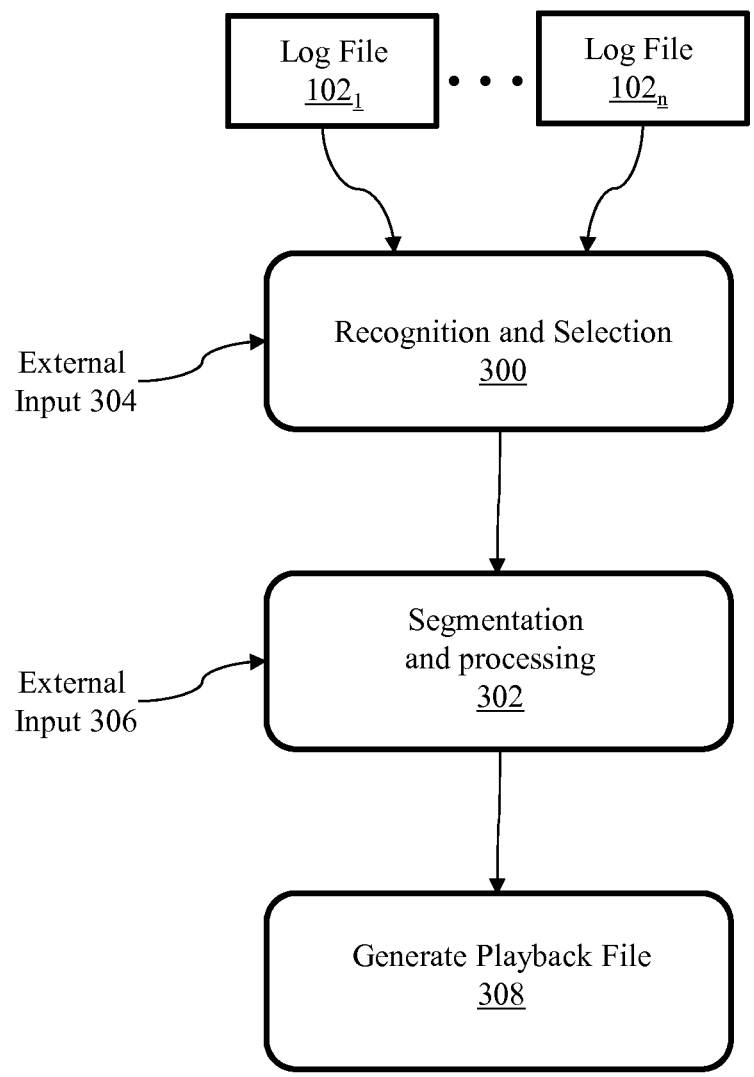
FIG. 3 illustrates playback file generation.

Referring to FIGS. 1 and 3, processor 103 generates the playback file 101 from one or more of the log files 102₁ through 102ₙ. A first step 300 in generating the playback file is event recognition and selection. Events can be recognized automatically by parsing log files for recognizable features or patterns. External input 304 may also or alternatively be utilized, e.g., users can recognize events via interface 112. External and internal event recognition may include an indication of event type and event start and stop times. Once the events have been recognized, one or more of the recognized events is selected. Event selection may be partially or completely automated. Event selection may also occur externally (with external input 304), internally or both. The next step 302 is event segmentation and processing. Segmentation is a procedure by which data associated with the selected events is copied to a new memory location, thereby distinguishing it from other data in the log files. Events which are segmented from a log file may be processed using various operations, although this is not a requirement. Segmentation and processing may also occur externally (with external input 306), internally or both. For example, an operator can manually segment and process events externally and provide the resulting data to the processor via the interface. Further, the processor may include algorithms for automatic event segmentation and processing. The processor generates the playback file in step 308 from the segmented and possibly processed events by arranging the events and possibly copies of the events in a time succession such that the time between events is controlled and typically reduced, but without disruptive discontinuity. As a result, the time required to test a device can be reduced relative to presenting events at the time intervals specified by the log files.

The term "event" is used broadly in this disclosure. An event may be any situation, signal or feature that can be characterized by recognizable properties, including but not limited to a call drop, handover, period during which capacity, QoS or coverage is sub-optimal, where resource management issues occur, where unique modulation, channel quality information (CQI) power measurement, reporting, or resource block distribution patterns occur. Moreover, an event may include multiple situations, signals and features.

The processor may also include one or more algorithms for automatic event recognition. The automatic event recognition algorithms perform statistical analysis of the conditions recorded in the log file with reference to a database of event profiles. The statistical analysis may include consideration of mean (average) values, standard deviation, variance, and higher order statistical moments of power and duration of sectors, base stations, and eNodeBs. Correlation, covariance, and correlation coefficient can be used to find relationships between events and quantify uniqueness of a candidate event. Candidate events which satisfy a predetermined uniqueness threshold are considered recognized events. The output of the event recognition step may include an indication of event type and start and stop times for each event.

Figure 4:
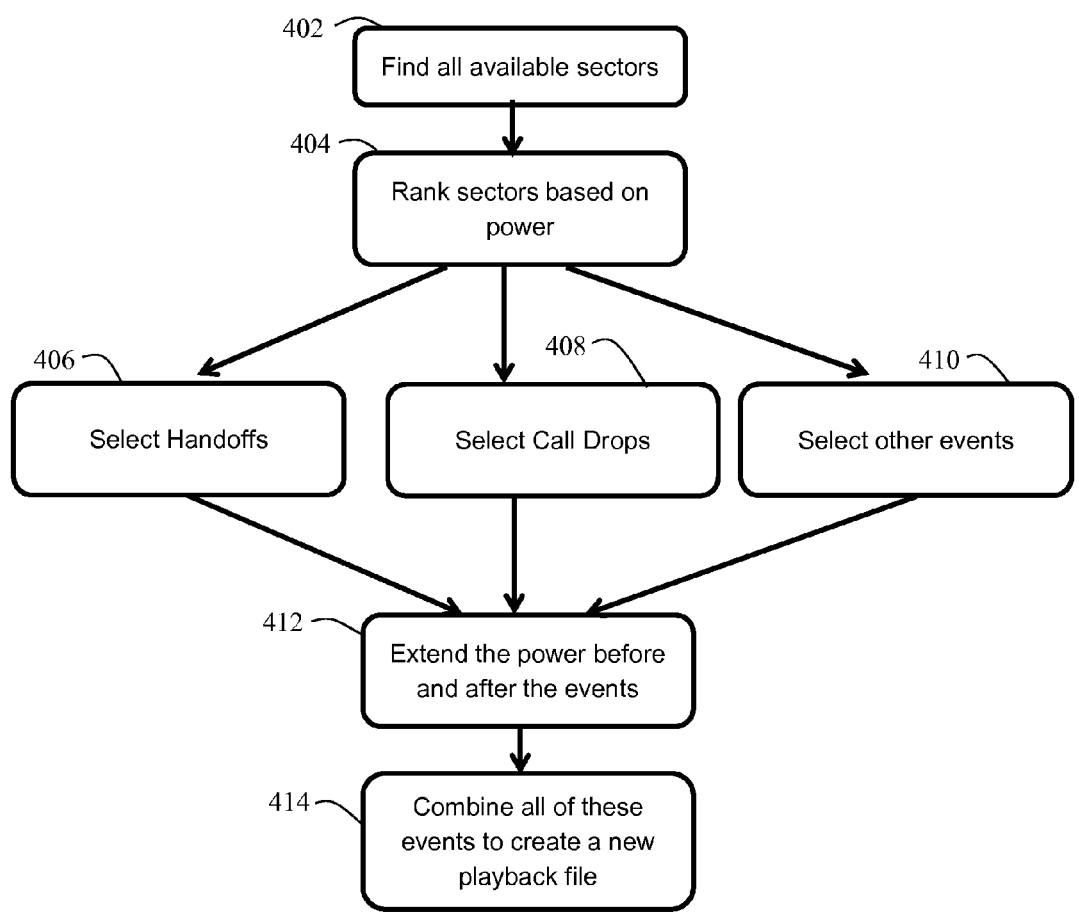
FIG. 4 illustrates event selection in greater detail.

FIG. 4 illustrates aspects of event selection in greater detail. An initial step 402 is to find all available sectors in UE log files which are imported into the software. The sectors are serving and neighboring sectors available and described in telecommunication network standards. The sectors are then ranked based on power and duration in step 404. For average power based ranking, the highest average power sector will be ranked as the first, and second highest average power sector will be ranked as second, and so on. For duration based ranking, the sector that has the greatest duration will be ranked as the first sector, and the sector that has the second greatest duration will be ranked as the second sector, and so on. Next, one or more types of events identified as described above are selected, e.g., select handoffs 406, select call drops 408, and select other (specified) events 410. Depending on the power level and duration of a particular sector, at different moments of time or for some duration of time, a particular sector will be selected. Selection of a particular sector will be denoted by sector ID. A handoff event is defined by a sector ID will changing from the current ID to a different sector ID. At any moment of time if there is no sector played a call drop will occur. The time of the call drops will be found and saved into memory, file or any other storage device. In addition to handoffs and call drops, any other network event can be detected. This network event can be any event that users are interested in playing back. An operator may utilize the interface to manually select events, e.g., using mouse clicks to select from a list of individual events or to select one or more types of events. The process may also be automated internally and using an external application. The indication of selected events is then provided to the processor. In the case of automatic event selection by the processor it may still be desirable for the operator to indicate which types of events are of interest. For example, the operator might indicate that handovers are of interest, thereby implicitly indicates that other events are not of interest. The event selection algorithm then filters the event list produced by the event recognition algorithm to remove events which are not of interest to the operator. The next step 412 is to extend the power before and after the events. Before and after the handoff point, the duration of the sector may be extended by a percentage that the user defines through the user interface. This duration may be defined as a percentage. The total duration of the sector will be multiplied by this percentage in order to determine the duration of the sectors before and after the handoff point. Next, the events are combined in step 414 to create a new playback file such that the events are presented in series with adequate recovery and transition time between events in order to avoid disruptive discontinuity. In particular, the segments of the handoff/call drop/ or any other events are combined in order to create a new scenario, and depending on this new scenario, a new playback file will be created. Advantageously, the original playback file may be shortened, and a new playback file may be created with shorter sectors and with more handoff events.

Figure 5:
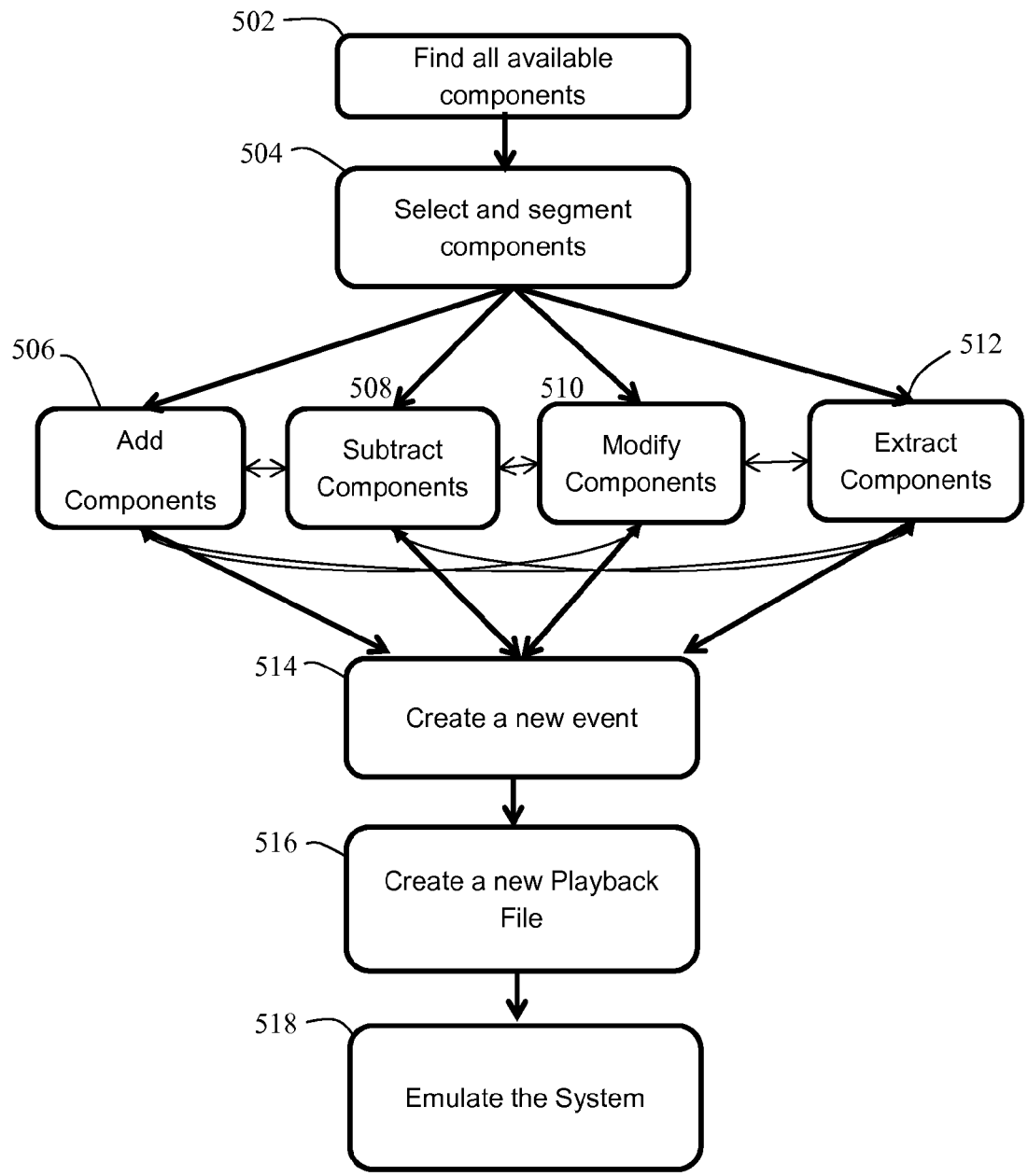
FIG. 5 illustrates segmentation and processing in greater detail.

FIG. 5 illustrates aspects of event processing in greater detail. An initial step 502 is to find all available components associated with the event. A component may be any feature associated with an event, including but not limited to one or more signals. The component need not represent all aspects of the event. For example, and event may include signals associated with various devices during a call drop, and the components may include signals from individual devices. One or more of the components are selected for segmentation in step 504, by which they are distinguished from other data associated with the event (unless the entire event is selected). The step may be manual, automated, or some combination thereof. For example, a user may utilize the interface to manually select components using mouse clicks to select from a list of individual components or types of components. The process may also be automated using an internal or external application. The indication of selected components is provided to the processor. In the case of automatic selection by the processor it may still be desirable for the operator to indicate which components are of interest. For example, the user might indicate that some components are of interest, thereby implicitly indicating that other components are not of interest. A selection algorithm then filters the list of available components to produce a list of selected components. A segmentation algorithm then segments the selected components to remove portions which are not of interest to the user, e.g., by cutting and copying based on a dynamic or static time window. Segmenting the event may also be based on user input through the graphical user interface. The remaining components may then be, but are not necessarily, processed by one or more operations including but not limited to adding components 506, subtracting components 508, modifying components 510, and extracting components 512. Adding 506 may include adding different components of the event (or multiple events) together. Subtraction 508 may include removing one or more components. Modifying 510 may include altering one or more components. Extracting 512 may include selecting a particular part or parts of the selected components. The results are used to create a new signal in step 514. The new signal is used to create a new playback file in step 516, and the new payback file is used to emulate the system in step 518.

The events included in the playback file may be altered by the operator. For example, one or more conditions associated with an event may be modified at the discretion of the operator in order to achieve desired test conditions. Event modification can be performed using the interface, e.g., by graphically manipulating values presented on a display or changing numerical values associated with a file. An external application might also be utilized.

The events included in the playback file may include copies of a single event. The operator can indicate via the interface not only that a particular type of event is of interest, but that a specific event is of interest and that specific events are repeated in the playback file. For example, the operator might select a particular handover to be repeated several times.

The quiet interval between events may also be modified by the operator via the interface. For example, the operator may manipulate a graphical representation of events shown in a time-domain graph, or input specific times between specific events using a keyboard.

Some or all of the features described above can be combined to provide a particularly versatile playback file generation tool. For example, an operator could cause the processor to automatically recognize and select handover situations from a set of log files to create a first playback file and test to find a particularly problematic handover for a device under test. A second playback file for a second test in which that particular handover event is repeated could then be generated. Moreover, the quiet intervals between occurrences of the event and conditions associated with the event could be manipulated to help determine why the particular event is problematic for the device under test. However, even if some of these features are not required by the operator, simply reducing the time between events is advantageous. Other advantages include support for log files in any type of file format, any size, title, name, extension, suffix, and prefix. Further, the diagnostic monitor may store the information in any type of log file.

Various aspects of the invention may be implemented by computer program code that is stored in non-transitory memory. The computer program code may be used by processing hardware to accomplish steps and functions such as those described below to facilitate evaluating wireless devices.

While the invention is described through the above exemplary embodiments, it will be understood by those of ordinary skill in the art that modifications and variations may be made without departing from the inventive concepts. Further, while the embodiments are described in connection with various illustrative structures, one skilled in the art will recognize that the system may be embodied in connection with other structures. Accordingly, the invention should not be viewed as limited except by the scope and spirit of the appended claims.

What is claimed is:

1. A method comprising:
   using a computer,
      recognizing events recorded in one or more log files of conditions in a wireless network;
      selecting at least first and second recognized events;
      processing ones of the selected events by performing one or more operations including segmentation, modification, extraction, addition, and subtraction;
      generating a playback file which represents the processed events; and
   assigning at least some resources of a channel emulator based on the playback file; and
   recreating conditions represented in the playback file using a channel emulator.

2. The method of claim 1 including generating the playback file such that time between the first and second recognized events in the playback file is characterized by reduced time between the first and second events in the playback file relative to time between the first and second events in the log files.

3. The method of claim 1 including processing the selected events based on statistical properties of the events.

4. The method of claim 3 wherein the statistical properties include one or more of average, standard deviation, and any higher order moments of a signal.

5. The method of claim 3 including using average power to find a particular part of an event using a time window.

6. The method of claim 3 including using standard deviation to find a particular part of an event using a time window.

7. The method of claim 3 including using higher order statistical moments to find a particular part of an event using a time window.

8. The method of claim 1 including processing the selected events based on user input.

9. The method of claim 1 including segmenting the event by cutting and copying based on a time window.

10. The method of claim 1 including segmenting the event based on user input through the graphical user interface.

11. The method of claim 1 including performing extraction by selecting a particular part or parts of the selected event.

12. The method of claim 1 including performing addition by adding different parts of the event together to create a new event.

13. The method of claim 1 including performing subtraction by removing some part of the event in order to create a new event.

14. The method of claim 1 wherein recognizing events includes automatic event recognition using an algorithm which performs a statistical analysis of conditions recorded in the log file with reference to a database of event profiles.

15. The method of claim 1 including utilizing at least one of correlation, covariance, and correlation coefficient to quantify uniqueness of a candidate event.

16. The method of claim 1 wherein selecting at least first and second recognized events includes receiving an external indication of event selection.

17. The method of claim 1 wherein selecting at least first and second recognized events includes automated event selection using an algorithm which compares recognized events with event type profiles.

18. The method of claim 1 wherein generating the playback file includes calculating values to achieve continuity of conditions between successive selected events in the playback.

19. The method of claim 1 wherein generating the playback file includes inserting multiple copies of a selected event into the playback file.

20. The method of claim 1 wherein generating the playback file includes inserting different events from different log files into the playback file.

21. The method of claim 1 wherein generating the playback file includes modifying a condition associated with a selected event which is included in the playback file.

22. The method of claim 1 including using a time window to define boundaries for the segmentation, extraction, addition and subtraction operations.

23. The method of claim 1 including generating the playback file such that time between the first and second recognized events in the playback file is characterized by increased time between the first and second events in the playback file relative to time between the first and second events in the log files.

24. A computer-implemented method comprising:
recognizing events recorded in one or more log files of conditions in a wireless network;
selecting at least first and second recognized events;
processing ones of the selected events by performing one or more operations including segmentation, modification, extraction, addition, and subtraction;
generating a playback file which represents the processed events;
assigning at least some resources of a channel emulator based on the playback file; and
recreating conditions represented in the playback file using a channel emulator.

25. The computer-implemented method of claim 24 comprising generating the playback file such that time between the first and second recognized events in the playback file is characterized by reduced time between the first and second events in the playback file relative to time between the first and second events in the log files.

26. The computer-implemented method of claim 24 comprising processing the selected events based on statistical properties of the events.

27. The computer-implemented method of claim 26 wherein the statistical properties comprise one or more of average, standard deviation, and any higher order moments of a signal.

28. The computer-implemented method of claim 26 comprising using average power to find a particular part of an event using a time window.

29. The computer-implemented method of claim 26 comprising using standard deviation to find a particular part of an event using a time window.

30. The computer-implemented method of claim 26 comprising using higher order statistical moments to find a particular part of an event using a time window.

31. The computer-implemented method of claim 24 comprising processing the selected events based on user input.

32. The computer-implemented method of claim 24 comprising segmenting the event by cutting and copying based on a time window.

33. The computer-implemented method of claim 24 comprising segmenting the event based on user input through the graphical user interface.

34. The computer-implemented method of claim 24 comprising performing extraction by selecting a particular part or parts of the selected event.

35. The computer-implemented method of claim 24 comprising performing addition by adding different parts of the event together to create a new event.

36. The computer-implemented method of claim 24 including logic which performs comprising performing subtraction by removing some part of the event in order to create a new event.

37. The computer-implemented method of claim 24 wherein recognizing events comprises automatically recognizing events using an algorithm which performs a statistical analysis of conditions recorded in the log file with reference to a database of event profiles.

38. The computer-implemented method of claim 24 comprising utilizing at least one of correlation, covariance, and correlation coefficient to quantify uniqueness of a candidate event.

39. The computer-implemented method of claim 24 wherein selecting at least first and second recognized events comprises receiving an external indication of event selection.

40. The computer-implemented method of claim 24 wherein selecting at least first and second recognized events comprises automatically selecting events using an algorithm which compares recognized events with event type profiles.

41. The computer-implemented method of claim 24 wherein generating the playback file comprises calculating values to achieve continuity of conditions between successive selected events in the playback.

42. The computer-implemented method of claim 24 wherein generating the playback file comprises inserting multiple copies of a selected event into the playback file.

43. The computer-implemented method of claim 24 wherein generating the playback file comprises inserting different events from different log files into the playback file.

44. The computer-implemented method of claim 24 wherein generating the playback file comprises modifying a condition associated with a selected event which is included in the playback file.

45. The computer-implemented method of claim 24 comprising using a time window to define boundaries for the segmentation, extraction, addition and subtraction operations.

46. The computer-implemented method of claim 24 comprising generating the playback file such that time between the first and second recognized events in the playback file is characterized by increased time between the first and second events in the playback file relative to time between the first and second events in the log files.

47. Apparatus comprising:
a processor which utilizes a computer program which:
recognizes events recorded in one or more log files of conditions in a wireless network;
selects at least first and second recognized events;
processes ones of the selected events by performing one or more operations including segmentation, modification, extraction, addition, and subtraction; and
generates a playback file which represents the processed events; and
a channel emulator which assigns at least some resources based on the playback file and recreates conditions represented in the playback file using the resources.

48. The apparatus of claim 47 wherein the processor generates the playback file such that time between the first and second recognized events in the playback file is characterized by reduced time between the first and second events in the playback file relative to time between the first and second events in the log files.

49. The apparatus of claim 47 wherein the processor processes the selected events based on statistical properties of the events.

50. The apparatus of claim 49 wherein the statistical properties include one or more of average, standard deviation, and any higher order moments of a signal.

51. The apparatus of claim 49 wherein the processor uses average power to find a particular part of an event using a time window.

52. The apparatus of claim 49 wherein the processor uses standard deviation to find a particular part of an event using a time window.

53. The apparatus of claim 49 wherein the processor uses higher order statistical moments to find a particular part of an event using a time window.

54. The apparatus of claim 47 wherein the processor processes the selected events based on user input.

55. The apparatus of claim 47 wherein the processor segments the event by cutting and copying based on a time window.

56. The apparatus of claim 47 wherein the processor segments the event based on user input through a user interface.

57. The apparatus of claim 47 wherein the processor performs extraction by selecting a particular part or parts of the selected event.

58. The apparatus of claim 47 wherein the processor performs addition by adding different parts of the event together to create a new event.

59. The apparatus of claim 47 wherein the processor performs subtraction by removing some part of the event in order to create a new event.

60. The apparatus of claim 47 wherein recognizing events includes automatic event recognition by the processor using an algorithm which performs a statistical analysis of conditions recorded in the log file with reference to a database of event profiles.

61. The apparatus of claim 47 wherein the processor utilizes at least one of correlation, covariance, and correlation coefficient to quantify uniqueness of a candidate event.

62. The apparatus of claim 47 wherein selecting at least first and second recognized events includes the processor receiving an external indication of event selection.

63. The apparatus of claim 47 wherein selecting at least first and second recognized events includes automated event selection by the processor using an algorithm which compares recognized events with event type profiles.

64. The apparatus of claim 47 wherein generating the playback file includes the processor calculating values to achieve continuity of conditions between successive selected events in the playback.

65. The apparatus of claim 47 wherein generating the playback file includes the processor inserting multiple copies of a selected event into the playback file.

66. The apparatus of claim 47 wherein generating the playback file includes the processor inserting different events from different log files into the playback file.

67. The apparatus of claim 47 wherein generating the playback file includes the processor modifying a condition associated with a selected event which is included in the playback file.

68. The apparatus of claim 47 wherein the processor uses a time window to define boundaries for the segmentation, extraction, addition and subtraction operations.

69. The apparatus of claim 47 wherein the processor generates the playback file such that time between the first and second recognized events in the playback file is characterized by increased time between the first and second events in the playback file relative to time between the first and second events in the log files.

* * * * *